US012770204B2

(12) United States Patent
Treadwell et al.

(10) Patent No.: US 12,770,204 B2
(45) Date of Patent: Oct. 20, 2026

(54) SYSTEMS AND METHODS FOR SOFTWARE AS A SERVICE MANAGEMENT USING MACHINE LEARNING AUTOMATION

(71) Applicant: Certinia Inc., Austin, TX (US)

(72) Inventors: Jessica Treadwell, San Diego, CA (US); Daniel Christian Brown, Bellevue, WA (US); Heidi Renee Minzner, North Andover, MA (US)

(73) Assignee: Certinia Inc., Austin, TX (US)

( * ) Notice: Subject to any disclaimer, the term of this patent is extended or adjusted under 35 U.S.C. 154(b) by 176 days.

(21) Appl. No.: 18/217,447

(22) Filed: Jun. 30, 2023

(65) Prior Publication Data

US 2025/0005690 A1 Jan. 2, 2025

(51) Int. Cl.
*G06Q 50/18* (2012.01)
*G06N 20/00* (2019.01)

(52) U.S. Cl.
CPC ............ *G06Q 50/18* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,295,375 | B1 * | 4/2022 | Chitrapura | G06Q 50/01 |
| 2021/0166251 | A1 * | 6/2021 | Mehmanpazir | G06Q 30/0202 |
| 2022/0292220 | A1 * | 9/2022 | Groth | G06F 21/604 |

* cited by examiner

*Primary Examiner* — George Chen
(74) *Attorney, Agent, or Firm* — Carr & Ferrell LLP

(57) ABSTRACT

Systems and methods for software as a service management using machine learning automation are disclosed herein. An example method includes determining current software-as-a-service (SaaS) applications being used by an organization, obtaining criteria for each of the current SaaS applications including at least a cost, a renewal date, uplift, and cybersecurity, generating a machine learning model for the organization that defines a functional fit based at least in part on the criteria, evaluating replacement SaaS applications when one of the current SaaS applications does not comply with the functional fit, the replacement SaaS applications also having criteria, and automatically generating new contract terms for any of the replacement SaaS applications.

22 Claims, 9 Drawing Sheets

SYSTEMS AND METHODS FOR SOFTWARE AS A SERVICE MANAGEMENT USING MACHINE LEARNING AUTOMATION

CROSS-REFERENCE TO RELATED APPLICATIONS

N/A

TECHNICAL FIELD

This disclosure pertains to machine learning, and more specifically, but not by way of limitation, to systems and methods that use machine learning to automate the management and use of applications, specifically Software-as-a-Service (SaaS) for an organization.

SUMMARY

According to some embodiments, the present disclosure is directed to a method comprising: determining current software-as-a-service (SaaS) applications being used by an organization; obtaining criteria for each of the current SaaS applications including at least a cost, a renewal date, uplift, and cybersecurity; generating a machine learning model for the organization that defines a functional fit based at least in part on the criteria; evaluating replacement SaaS applications when one of the current SaaS applications does not comply with the functional fit, the replacement SaaS applications also having criteria; and automatically generating new contract terms for any of the replacement SaaS applications.

According to some embodiments, the present disclosure is directed to a system comprising a processor and a memory for storing instructions, the instructions being executed by the processor to: determine current software-as-a-service (SaaS) applications being used by an organization; obtain criteria for each of the current SaaS applications including at least a cost, a renewal date, uplift, and cybersecurity; generate a machine learning model for the organization that defines a functional fit based at least in part on the criteria; evaluate replacement SaaS applications when one of the current SaaS applications does not comply with the functional fit, the replacement SaaS applications also having criteria; generate a dynamic playbook that is used to optimize a selection process for replacing or retaining SaaS applications; and generate a dashboard that indicates recommendations of the current SaaS applications that should be replaced.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXAMPLE EMBODIMENTS

Overview

One of the largest and most difficult areas to control for all organizations is SaaS procurement and usage. Controlling SaaS deployment is difficult because the procurement of SaaS deployment has become scattered across organizations. Individuals and business units are triggering the largest portion of the SaaS procurement. As SaaS contracts can be multi-year and variable in cost due to changes caused by uplifts, number of users, and so forth, this creates difficulty ensuring deployment is managed upfront, committed future spend is understood and properly accounted and/or allocated for in budgeting and planning, and that IT has visibility to understand compliance and security issues. Also, functional fitting is necessary in order to determine the suitability of SaaS for an organization. Functional fit can be a multi-faceted view of not only the needs of an organization, business unit, or individual but also in view of the parameters or attributes of the SaaS.

The present disclosure relates to systems and methods that use machine learning to automate the management and use of applications, and specifically Software-as-a-Service (SaaS) for an organization. Various embodiments relate generally to data science and data analysis, computer software and systems, and computing architectures and data models configured to facilitate the management and performance of organizational functions, and, more specifically, to a computing and data processing platform configured to implement applications and computerized tools configured to algorithmically detect, monitor, and analyze data exchanges SaaS resources, and further configured to predict utilization of resources and to forecast uses of resources to modify access to SaaS resources associated with one or more vendor computing platforms so as, for example, to control data representing expenditures of an enterprise or any organization.

These systems and methods can be configured generally to provide predictive analytics and change management capability and visibility to future management from structured schedules, which allows an organization to more accurately predict future deployment parameters during planning activities. Another aspect uses machine learning or other artificial intelligence which uses categorization algorithms to recommend a best vendor "fit" based on criteria and historical data pertaining to the organization. Another aspect is the use of dynamic playbooks to optimize a vendor selection process by utilizing weighted metrics triggering automated adjustments to playbook processes. These and other aspects of the present disclosure are set forth herein with reference to the collective drawings.

Example Embodiments

Figure 1:
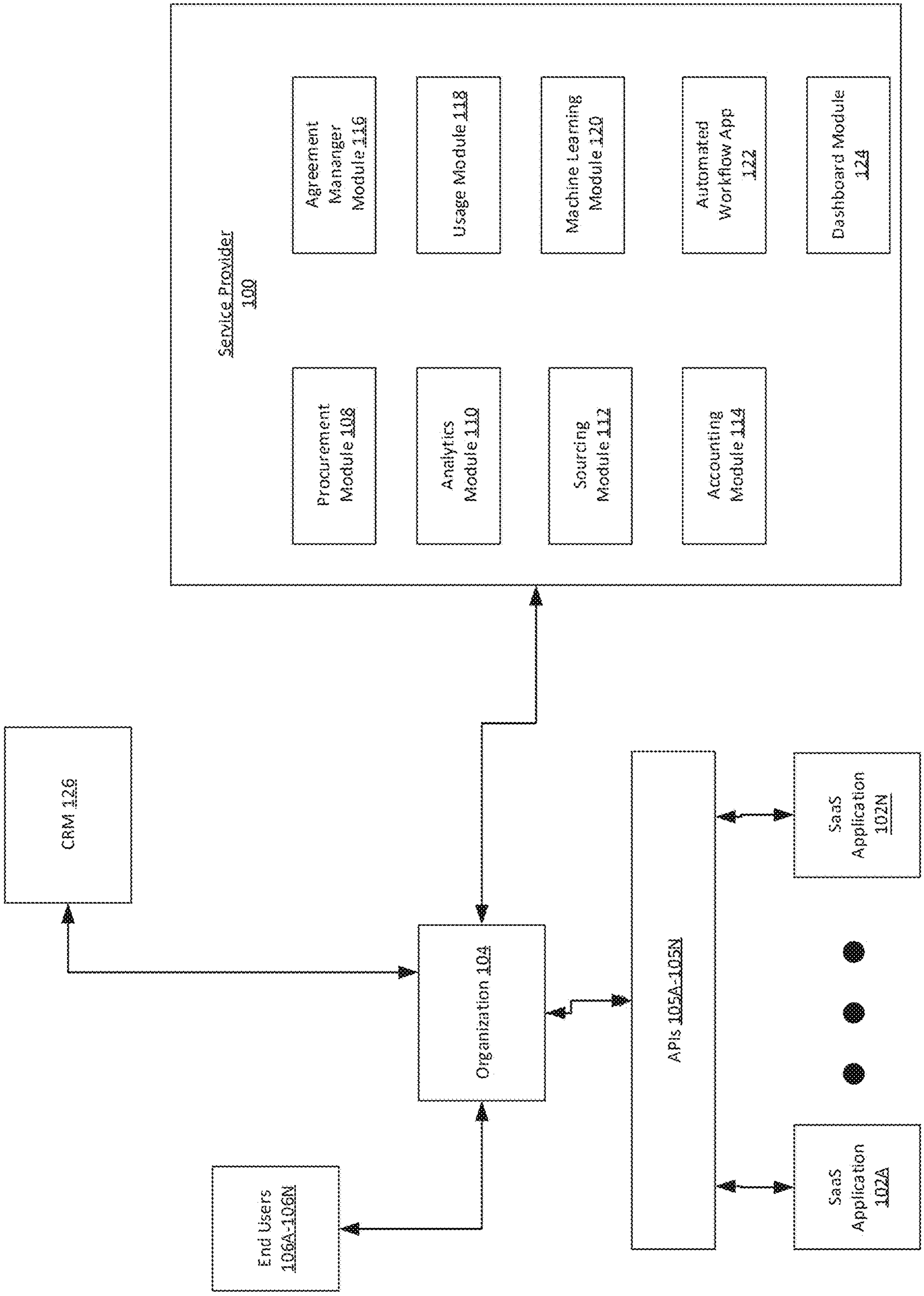
FIG. 1 is an example environment where aspects of the present disclosure can be implemented for use.

Referring now to FIG. 1, which illustrates an example architecture where aspects of the present disclosure are implemented. The architecture includes a service provider 100, various SaaS applications/vendors 102A-102N, an organization 104, and end users 106A-106N. It will be understood that the functions of the service provider 100 can be executed at the organization level, or as a stand-alone application.

In general, the end users 106A-106N may be permitted to one or more of the SaaS applications/vendors 102A-102N at a local or mobile machine. The service provider 100 tracks the SaaS applications/vendors 102A-102N used by the organization and the individual end users. In some instances, the organization 104 and/or end users 106A-106N connect to the SaaS applications/vendors 102A-102N through application programming interfaces (APIs) 105A-105N. The service provider 100 can collect data regarding the SaaS applications and their usage inside the organization at least partially from the API traffic. Some data regarding SaaS applications and organizational data can be manually input by a user.

In general, the service provider 100 can implement various modules or services that can be used to provide the SaaS management features described throughout. In some embodiments, the modules can include a procurement module 108, an analytics module 110, a sourcing module 112, an accounting module 114, an agreement manager module 116, a usage module 118, a machine learning module 120, an automated workflow application 122, and a dashboard module 124.

In general, tracking the use and deployment of SaaS in the organization can be difficult, if not impossible. This lack of tracking can lead to security holes or attack points, as well as uncontrolled spending on SaaS from untracked renewals or overspending. In addition, the current blend of SaaS used by the organization and/or individual users may not be a best functional fit for the organization. Therefore, the service provider 100 can generate a machine learning (ML) model for organization 104 and determine if current SaaS applications or replacement SaaS are a better functional fit, for the organization 104. For example, the ML model can determine if SaaS applications meet or exceed an organization's 104 purchase criteria-satisfies (such as satisfy use cases, within budget, can be implemented within a specific time frame, etc.). An assessment of business value the organization intends to gain from the solution can be determined as well. This can include determining attributes for the organization, as well as criteria for each of the current SaaS applications and any replacement or new SaaS applications. These criteria and attributes can be individually weighted to give importance to those criteria or attributes that the organization desires, or that the machine learning modeling uncovers. Thus, the needs of the organization and the capabilities/cost of the SaaS can be evaluated and modeled with machine learning to uncover aspects that may not be intuitive or easily identifiable to an end user or administrator.

In some instances, functional fit can relate to a list of capabilities needed from a SaaS application to perform a task or tasks, meet defined expectations, or provide solutions for problems. The criteria collected for the SaaS applications can include data representing terms in an electronic document constituting requirements associated with an exchange of data. These include attributes such as throughput, cycle time, cost and contract terms, specifications, and the like.

In some instances, functional fit data can be used to renew, negotiate with, or replace vendors (what did they do well or not well). The functional fit can be modeled with machine learning, and recommended actions can be generated by the service provider. For example, if the current renewal rate for a SaaS application that provides defined output averages a three to five percent renewal rate increase, and one SaaS application used by an organization is about to renew at a 10% uplift rate, the service provider can alert users before the renewal date and suggest replacement SaaS applications that have substantially equivalent features (functional fit) but have uplift rates that are closer to the average renewal rate of three to five percent.

Also, the analysis provides the organization with a holistic view whereas individual users who are purchasing SaaS for their machines might not appreciate the overall needs or functional fit of that particular instance of SaaS in the organization. For example, the machine learning engine of the service provider 100 may determine that a selected instance of SaaS is not a functional fit for the organization due to cybersecurity vulnerabilities. In another example, an end user may not realize that the organization subscribes to a SaaS that fits a particular need of the user and the user has instead purchased a subscription to a different SaaS that is not a functional fit for the organization 104.

In some instances, the service provider 100 can automatically generate and update the functional fit of the ML model and automatically generate contract terms or even smart contracts for procuring new or replacement SaaS, or renewing current SaaS. In some instances, the functional fit or model created for the organization 104 can be created by assessing the current needs of the organization, organizational SaaS budget, cybersecurity needs, network design, and so forth. Additional details on each of these aspects are found infra.

Also, in some embodiments, machine learning of the service provider 100 can learn and improve over time, or adapt to fit the ever-changing needs of the organization or feature changes in SaaS application(s). For example, as users migrate in and out of divisions, the number of contract seats for SaaS may change over time. If adjustments to the seat fees are not made in a timely manner, excess costs may be realized and unnecessary. In another example, as cybersecurity needs change, for example, the organization needs to comply with GDPR because they gained European customers, the service provider can automatically audit SaaS applications to ensure GDPR compliance and suggest alternative SaaS vendors who are GDPR compliant when a SaaS application is determined to not be GDPR compliant. Again, these are data that can be collected from the vendor or a third-party resource or trade organization.

As used herein, criteria data may include data values indicating terms or attributes of a SaaS application or vendor. In some cases, data representing attributes may be defined in a data model with data arrangements setting forth subsets of data metrics representing requirements (e.g., pricing and other terms described electronically to facilitate automatic acquisition and usage of an item, such as a purchase order ('P.O.'), a contract, a smart contract, or any other agreement or obligation).

For context, an example logical segmentation of the features provided by the service provider is as follows, an initial management process pertains to users who are MVP (early adopters) of SaaS applications. The initial management process includes aspects of requisition, contract establishment, purchase orders, matching, payment, and renewal. The service provider can then track criteria such as remaining contract balance, total obligation over time monetary), renewal management, and monetary outlay with a vendor (actuals/committed).

Next, a procurement and project playbook process involves a collaborative process to manage the evaluation of suppliers/vendors for SaaS commitment. In some instances, the service provider can create an audit trail of a procurement process and provide visibility to potential usage. The service provider can track objectives across departments such as legal, IT, finance, requesting department, and so forth, as well as track expected results against awarded contracts for evaluation at renewal.

The service provider is also configured to execute processes related to the discovery and insights of SaaS software. In this process, the service provider collects and analyzes many dimensions (criteria) of functional flows across SaaS applications. Spend on SaaS applications are tracked (distributions and allocations) at the line level. Spend can be viewed by department, location, and supplier management. The service provider can give users the ability to audit to locate and control SaaS spending, both current and projected. Complete cash flow analysis projections, as well as planning and expense deferring, can be exposed by the service provider. Finally, processes involved with the integration of SaaS providers and user management in are enabled. This can include determining SaaS cost per user, the discovery of underutilized subscriptions, onboarding and off-boarding, as well as granular planning.

Referring back to FIG. 1, the procurement module 108 of the service provider can be executed to allow for the creation of SaaS categories and sublevels of categories. The procurement module 108 also provides for SaaS contract creation, which in some instances includes automated contract creation, including smart contracts that can be recorded on a blockchain. The procurement module 108 can include a line-level creation process which can have invoice terms and cost type for the SaaS. The procurement module 108 also creates spend commitment (P.O. lines) and cost schedule creation. The cost schedule can include term provisions and renewal dates, as an example. The procurement module 108 can provide change provisions that deal with aspects such as proration and uplift (contract price increases), as well as renewals where future dates tied to renewals are managed. In some instances, users can be informed prior to renewal dates and an automatic SaaS evaluation process can be executed by the service provider to review the functional fit of the SaaS application prior to renewal.

An analytics module 110 can be used to create a renewal calendar (see FIG. 5A) and to generate procurement data that can be sorted by category and supplier/vendor. The total lifetime value or cost of the SaaS applications can be tracked as well. A sourcing module 112 is executed to generate and display aspects of sourcing/procurement project management for SaaS applications.

The accounting module 114 can be configured to evaluate and display dimensions across functional flows, line level allocations (per contract, per SaaS application), as well as budget integration and cash flow analysis. An agreement manager module 116 can be configured to evaluate purchase contracts and lines (could be types and numbers of users) and create a display or dashboard where service-level agreements can be visualized. SaaS application usage data can be captured through analysis of API data, and analytics using a usage module 118, which also translates SaaS spend to planning.

An automated workflow application 122 can be configured to automate contract provisions or smart contract creation. For example, as noted above, if the service provider determines that a replacement SaaS application is a better functional fit for the organization, the automated workflow application 122 automatically generates a new contract that can be approved and/or executed by a user with the requisite authority. An automated workflow process application may include playbook logic (or runbook logic), which can cause the automatic selection of one or more suppliers or alternate suppliers that provide the alternate or replacement SaaS application.

The automated workflow process may include automation computing logic that can be configured to automatically extract one or more of project data, billing data, and supply chain data (and associated metadata) from multiple disparate data sources for establishing and maintaining a supplier relationship to exchange data in accordance with objectives of an organization. Automation computing logic, or "playbook" logic, may be configured to implement at least a portion of a runbook application (or any other application or programmatic script, including a "playbook" and associated logic) that may be configured to automatically access—through runbook automation—any number of disparate data sources from which to select a supplier to manage the expenditure of resources. Data sources may include different software applications, different operating systems, and/or different database repositories, each of which may be associated with a supplier computing platform that may be engaged to provide a good or service (e.g., categorized as either direct or indirect spend-related supplies) including any other vendor computing platform. Vendor computing platforms may include software as a service ("SaaS") supplier computing platforms, as well as facilities supplier computing platforms, which may be configured to facilitate the acquisition of utilities, reconciliation of taxes, and other similar recurring expenses. Equipment supplier platforms may be configured to provide any type of equipment (e.g., computing devices, mobile phones, virtual servers, office equipment, etc.). Marketing supplier computing platforms may be configured to provide sales and marketing (e.g., via social media, etc.) to facilitate sales of a good or service provided by an enterprise. Contractor supplier computing platforms may be configured to contract services, such as software developers, mechanics, etc., to support an enterprise. Component supplier computing platforms may be configured to provide, for example, tangible or physical elements to produce a product. Any of the aforementioned supplier computing platforms may be a contributing factor to indirect spend as well as direct spending. In general, any SaaS application can be considered and evaluated.

Figure 2:
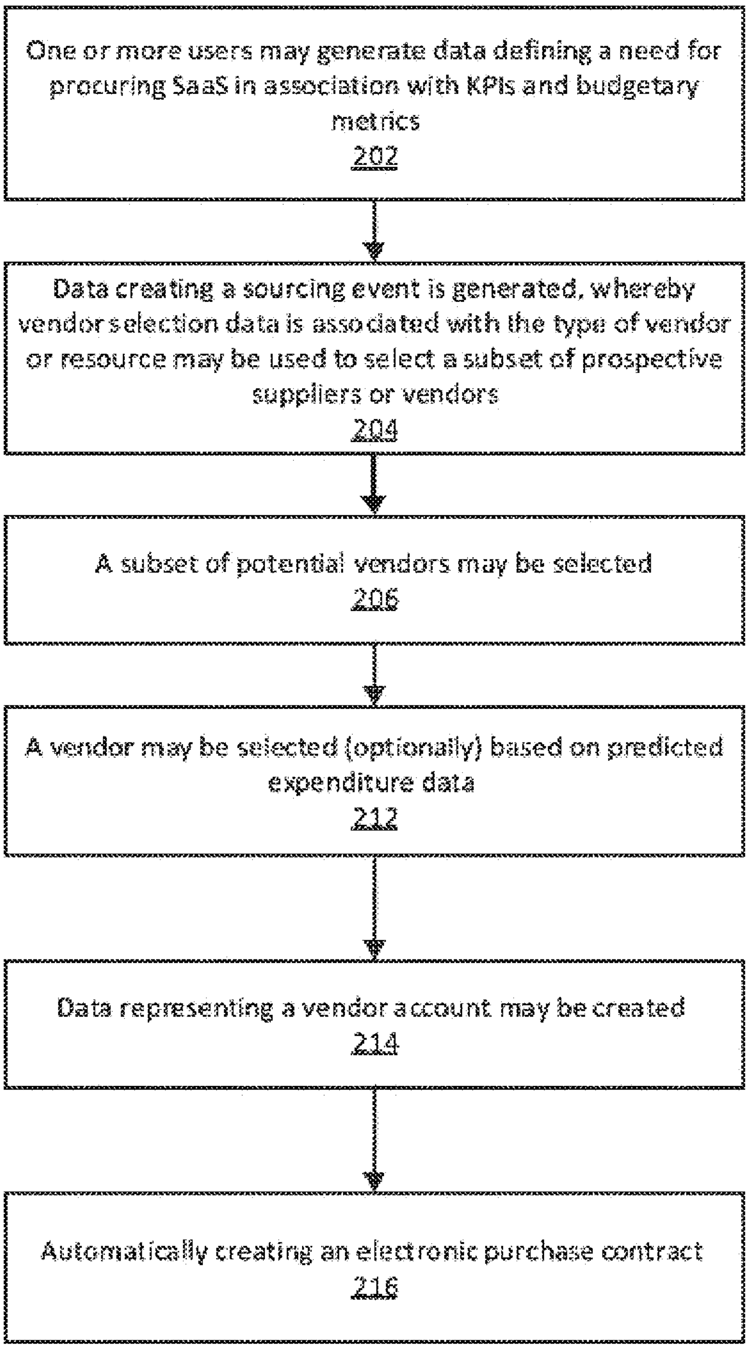
FIG. 2 is a flowchart of an example of an automated supplier workflow configured to provide automation to manage expenditures of resources, according to various examples.

FIG. 2 is an example of an automated supplier workflow configured to provide automation to manage expenditures of SaaS applications, according to various examples. In some examples, automated supplier workflow may be implemented by one or more components of an automated supplier workflow process application, such as playbook logic, runbook logic, and the like. Logic is used (e.g., by stakeholders or others) to select the vendor or supplier, such as role data function logic (e.g., any role or department), role data function logic (e.g., legal review), and role data function logic (e.g., security review), any of which may be associated with the user account or computing device. Further, initial resultant logic is configured to determine initial terms or criteria data for purchasing or licensing SaaS, procurement execution logic is configured to procure or otherwise acquire an item from a vendor, and vendor selection logic is configured to select a vendor.

At 202, one or more users may generate data defining a need for procuring SaaS in association with KPIs and budgetary metrics. At 204, data creating a sourcing event (obtaining a new SaaS application) is generated, whereby vendor selection data is associated with the type of vendor or resource that may be used to select a subset of prospective suppliers or vendors. One or more applications or playbook applications may be activated to automatically perform business process rules to obtain legal review, security review, initial resultant in terms (e.g., criteria data from an RFQ or PO) of acquiring an item, and an action of reviewing a vendor/supplier.

At 206, a subset of potential vendors may be selected. Vendors may be assessed and compared against each other as well as KPIs designed to manage spend (e.g., assessed for functional fit). A vendor may be selected at 212 (optionally) based on predicted expenditure data. Data representing a vendor account may be created at 214, with an electronic purchase contract formed at 216, which is automatically generated. Thereafter, a machine learning module may be configured to analyze and monitor data associated with a vendor to determine whether a procured item is meeting enterprise KPIs as well as whether alternate suppliers may be considered.

Playbook logic, runbook logic, and the like may be automated applications to perform computerized tasks rather than manual intervention. In various examples, playbook logic, runbook logic, and so forth, may be implemented using code to enable users to facilitate the assessment of a vendor or supplier (e.g., code may be pre-written or scripted, generated on an ad-hoc basis, formed in accordance with the templated electronic document, such as implemented in HTML, etc.). Playbook logic, runbook logic, and other executable instructions may be configured to automatically execute computerized tasks to acquire a SaaS application(s) to facilitate the operation of an enterprise or organization. In some examples, activating an automated workflow application may include generating electronic messages to a subset of end users associated with workflow to procure an item (e.g., a cloud-based or 'SaaS' application) or modify one or more terms or attributes with which the item is implemented by a supplier of a resource.

In some examples, some users may be configured to grant authority to approve the acquisition of a SaaS application(s) or modification with which the SaaS application(s) is implemented. For example, an organization may form a workflow that may require legal approval (e.g., review of an action to ensure an expenditure comports with legalities of various jurisdictions), while requiring that a SaaS application(s) or item supplied by a vendor also comports with certain security requirements (e.g., whether data access to a vendor computing platform comports at least with a minimal level of data security, such as using data protocols configured to implement encryption such as related to PCI DSS protocols, ACH protocols, and so forth). A computerized workflow may be configured to align electronic transactions (e.g., relating to supplier-based acquisitions) in accordance with subsets of data metrics representing financial requirements (e.g., pricing and other terms described electronically to facilitate automatic acquisition and usage of an item, such as a purchase order ('P.O.'), a contract, or any other agreement or obligation.). In at least one example, approval at one or more end users may be performed automatically. For example, a user account may be configured to execute instructions to populate data automatically into a template (e.g., a website) or otherwise drive approval according to a subset of instructions constituting a playbook or runbook approval logic.

In some embodiments, the machine learning module of the service provider can not only analyze contract attributes and lines for vendors, but also historical data for other contractual relationships such as customers of the organization. For example, the service provider can be configured to predict how long a customer will take to pay an invoice. The service provider can generate suggestions or action steps to improve or accelerate the timeline for payment. In one instance, the service provider examines the payment history for the customer and determines that if a payment method is changed from credit card to wire transfer, the payment will likely be received five days earlier. This can be determined from prior invoices sent and the time it took to receive payment, including the types of payment methods used. Thus, the service provider can be configured to evaluate invoices and subsequent payments for a customer, evaluate payment history for the customer, and generate a suggestion to shorten the time span for payment of an invoice based on the payment history.

Figure 3:
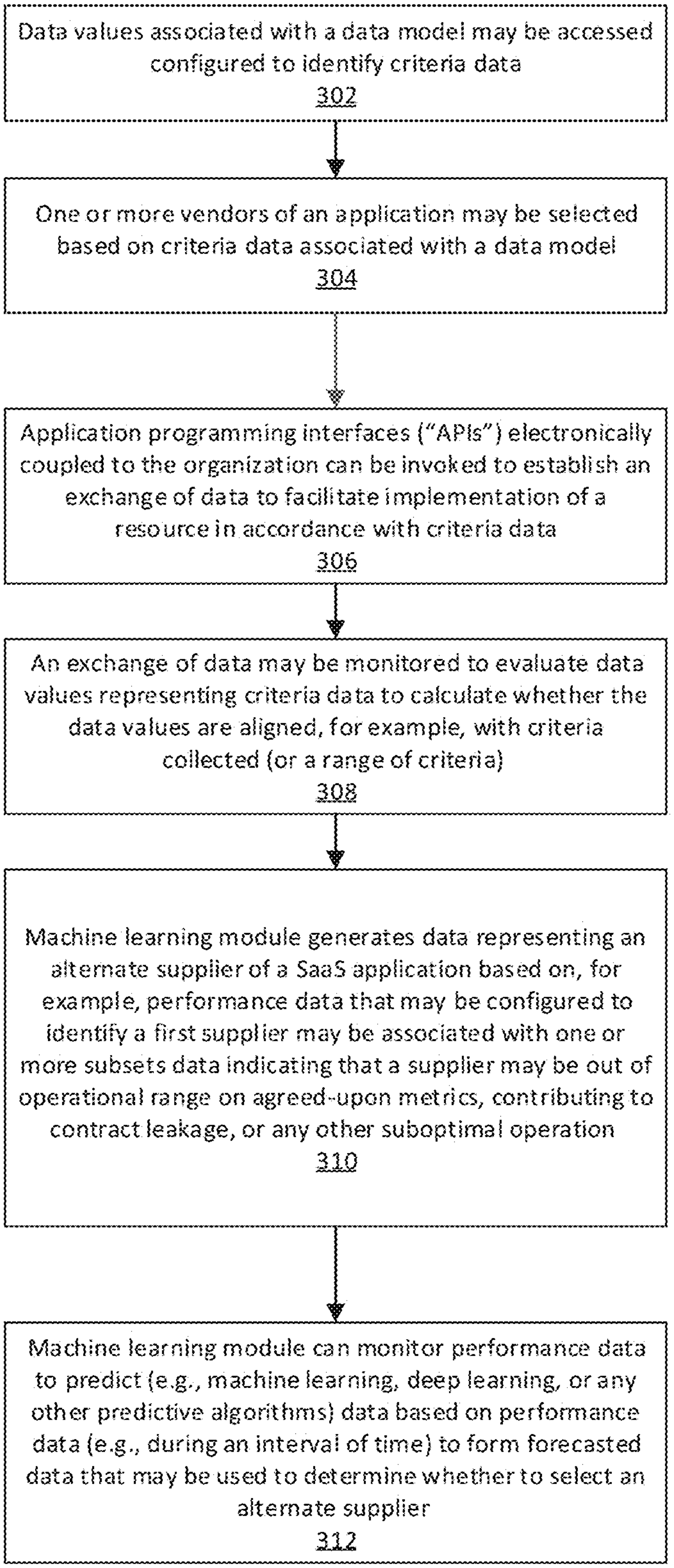
FIG. 3 is a flowchart that depicts an example process that can be executed by a machine learning module of the service provider.

Referring now to FIG. 3, which depicts an example process that can be executed by a machine learning module of the service provider. At 302, data values associated with a data model may be accessed and configured to identify criteria data. This can include criteria of current or replacement SaaS applications, as well as parameters of the organization. In various examples, data may be configured to analyze the performance of one or more data flows by a processor executing coded instructions. At least one data flow may be associated with evaluating an objective of an organization, such as the performance of a contract, a purchased order, or any other obligation represented in a data model. Thus, modeling of the organization can be first created and then subsequently updated by the machine learning module.

In some examples, data values representing key performance indicators ("KPIs") can be stored as a data model that may be used to monitor and detect whether a workflow or an automated process of an organization is operating in accordance with one or more rules defining, for example, an objective of the organization. An objective defined in the data model may be configured to minimize "contract leakage" (e.g., an expected value of a contract and associated computerized processes may deviate from an actual or monitored value of an obligation over a certain duration), or any other metric. Criteria data may include data representing terms or requirements associated with, or extracted from, one or more electronic documents. An electronic document may constitute obligations or actions associated with an exchange of data that may be stored in a data repository (e.g., a database) as a data model A data model may be a data arrangement that defines a hierarchy or linked data describing objectives of a contract and implement automated processes of an enterprise, according to a least some cases.

At 304, one or more vendors of an application may be selected based on criteria data associated with a data model. A "supplier," a vendor, or any provider of a product or service may be associated with a supplier computing platform with which an enterprise data computing platform may be configured to exchange data communication (e.g., via a network) with various supplier computing platforms to monitor and modify financial status or "health" of an enterprise or organization to efficaciously implement data to provide goods or services to a client (e.g., a consumer or client computing device).

At 306, application programming interfaces ("APIs") electronically coupled to the organization can be invoked to establish an exchange of data to facilitate implementation of a resource in accordance with criteria data so as to comport with data representing objectives of an enterprise, such as optimally implementing a resource (e.g., a software program) based on headcount and roles of employees that may impinge on or relate to needs of an enterprise. In some examples, the invocation of an API may be configured to access exchanges of data with a customer relationship management 126 ("CRM") computing platform hosted by the service provider. In other examples, one or more APIs associated with a sourcing event may be identified and accessed to invoke a subset of APIs that may be configured to access via a network a subset of supplier computing platforms. Thus, activation of one or more targeted APIs may facilitate the operation of SaaS-based programs that may be monitored, analyzed, and, in accordance with a criterion, modified to select an alternate vendor.

At 308, an exchange of data may be monitored to evaluate data values representing criteria data to calculate whether the data values are aligned, for example, with criteria collected (or a range of criteria). The machine learning module can generate performance data representing one or more characteristics that identify, for example, one or more features descriptive of operation of a system, such as an enterprise or an organization. In at least some examples, the machine learning module may be configured to calculate and identify data representing 'direct' and 'indirect' expenditures or 'spend' to retrieve or access a resource, like a subscribed software application (e.g., a Microsoft® product, such as Microsoft 365). In some examples, direct spend may refer to data representing costs linked to the procurement of raw materials, supplies, or any other item (usually tangible, but need not be so) for generating, designing, manufacturing, assembling, packaging, and transporting an end product for a customer or consumer. As described, indirect spend may refer to data representing indirect costs linked to activities ancillary to providing a specific product or service. For example, indirect expenditures may refer to resource expenditures that may include data representing a currency value (regardless of interest or other mechanisms with which to exchange monetary data), and data representing a volume or number of units supplied (as well as other duration requirements). In some examples, data representing a geographic location of from which an item is delivered (e.g., based on any global location), which may be analyzed by a processor to determine indirect costs associated with delivery of an item, such as whether delivery an item may be at risk due to climate-related issues, war-related issues, fuel-related costs, etc. In view of the foregoing, a processor may be configured to calculate data representing an amount of "contract leakage" or any other metric with which to measure or analyze the supplier relationship with an enterprise data computing platform.

At 310, the machine learning module generates data representing an alternate supplier of a SaaS application based on, for example, performance data that may be configured to identify a first supplier may be associated with one or more subsets data indicating that a supplier may be out of operational range on agreed-upon metrics, contributing to contract leakage, or any other suboptimal operation. In some examples, the aforementioned method may be configured to monitor performance data, and may be further configured to calculate utilization of the resource to form utilization data. In various examples, utilization of a resource may be calculated automatically by usage per unit time (e.g., a licensed computer program), per employee, per computing device, and the like. Utilization of a resource may be an attribute with which to determine whether to continue using the resource, or modify the usage of the resource (e.g., if projected to increase usage associated with increases in employees). In one instance, a subset of suppliers. including data representing an alternate supplier, may be analyzed to select the alternate supplier as a function of the utilization data. As an example, an alternate supplier may provide newer technological features and versions than a previous supplier. At 312, the machine learning module can monitor performance data to predict (e.g., machine learning, deep learning, or any other predictive algorithms) data based on performance data (e.g., during an interval of time) to form forecasted data that may be used to determine whether to select an alternate supplier. Forecasted data can also be used to estimate changes in the organization, such as personnel growth or decline, which affects SaaS contract terms.

Figure 4:
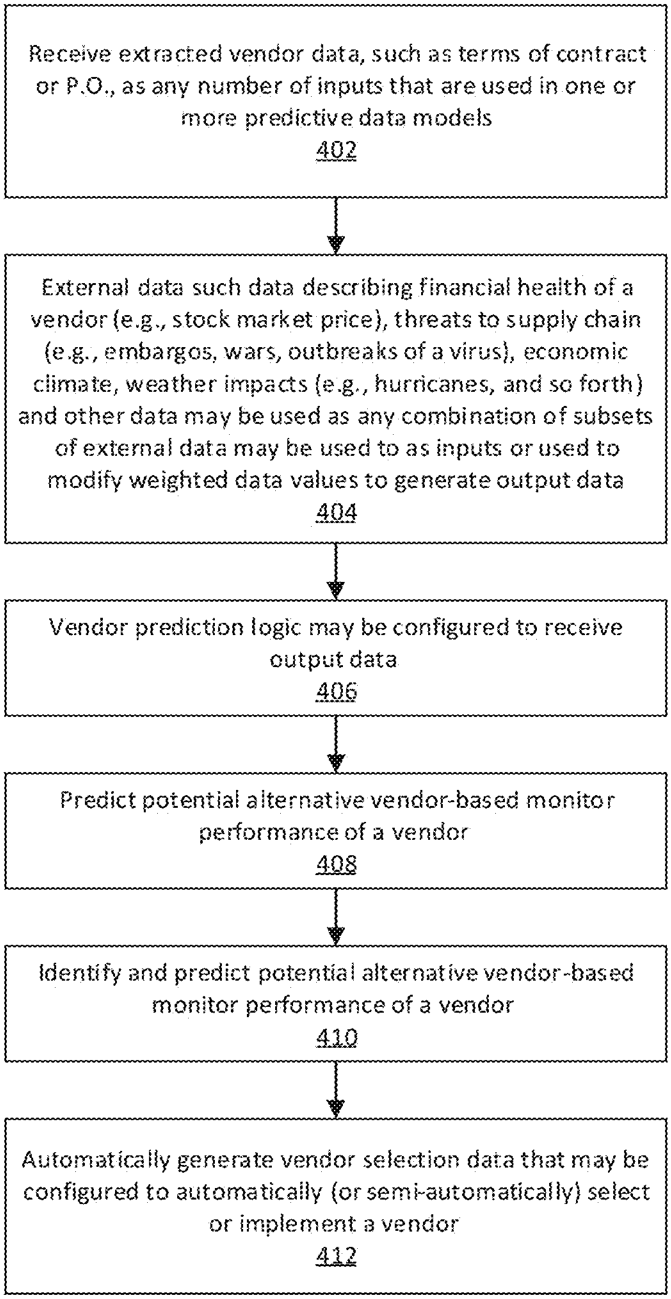
FIG. 4 is a flowchart of an example vendor prediction classification process.

In FIG. 4, a vendor prediction classification process is configured in step 402 to receive extracted vendor data, such as terms of contract or P.O., as any number of inputs that are used in one or more predictive data models. External data such data describing financial health of a vendor (e.g., stock market price), threats to supply chain (e.g., embargos, wars, outbreaks of a virus), economic climate, weather impacts (e.g., hurricanes, and so forth) and other data may be used as any combination of subsets of external data may be used as inputs or used to modify weighted data values to to generate output data in step 404. Weights can be automatically adjusted, or manually configured by a user. For example, cost can be weighted more highly than contract length or uplift. In another example, cybersecurity capabilities can be weighted higher than uplift, but lower than overall cost. Vendor prediction logic may be configured to receive output data in step 406 to identify and predict potential alternative vendor-based monitor performance of a vendor in step 408 as well as external factors.

In general, the machine learning module may be configured to receive constraint data as well as data representing evaluated vendors and predicted vendors in step 410 to automatically generate vendor selection data that may be configured to automatically (or semi-automatically) select or implement a vendor in step 412. Note that predictive models and classifiers are not intended to be limiting are examples. In some examples, classifiers may be configured to implement any machine learning algorithm, deep-learning algorithm, or any other predictive algorithm (e.g., Bayesian, etc.), including, but not limited to algorithms implementing support vector machines ("SVMs"), various types of neural networks (e.g., convolutional neural networks ("CNN"), recurrent neural networks ("RNN"), artificial neural networks ("ANN"), and the like), various regression techniques, various k-means computations, or any other like algorithms.

Figure 5A:
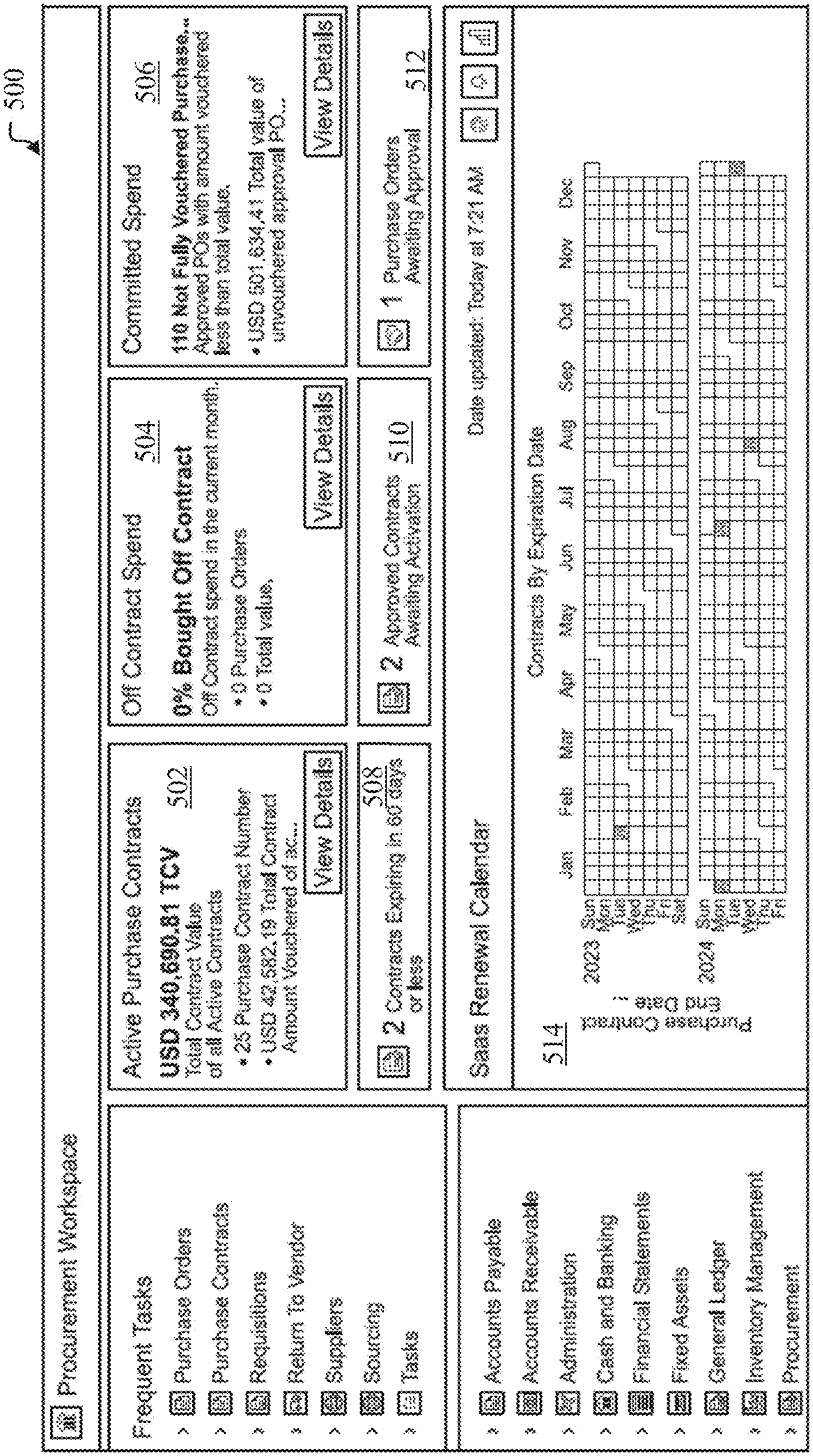
FIGS. 5A-5C collectively illustrate example dashboards of the present disclosure.

FIG. 5A is an example graphical user interface (dashboard 500) that is generated by a dashboard module 124 (see FIG. 1) of the service provider. The dashboard 500 gives a procurement user of the organization a broad view into the SaaS applications used. The dashboard generally identifies the total SaaS spend 502, the number of SaaS applications bought off contract 504 and the number of SaaS applications that are not fully vouchered purchases 506. The dashboard also identifies the number of SaaS application contracts that are expiring 508 within a period of time, which in this example is 60 days, a number of SaaS application contracts awaiting activation 510, and also P.O.s that are awaiting approval 512. To be sure, the dashboard allows the user to specify how many days in advance the system is to generate renewal notices. For example, for expiring contracts, the user can be warned 30, 60, or 90 days in advance of the impending renewal. Also, the service provider can automatically create renewal reminders from renewal terms present in the current SaaS contract. These terms are automatically transmitted to the vendor and the contract is renewed. The terms could be automatically transmitted over an API to the vendor or to a cloud operated by the vendor.

Figure 5B:
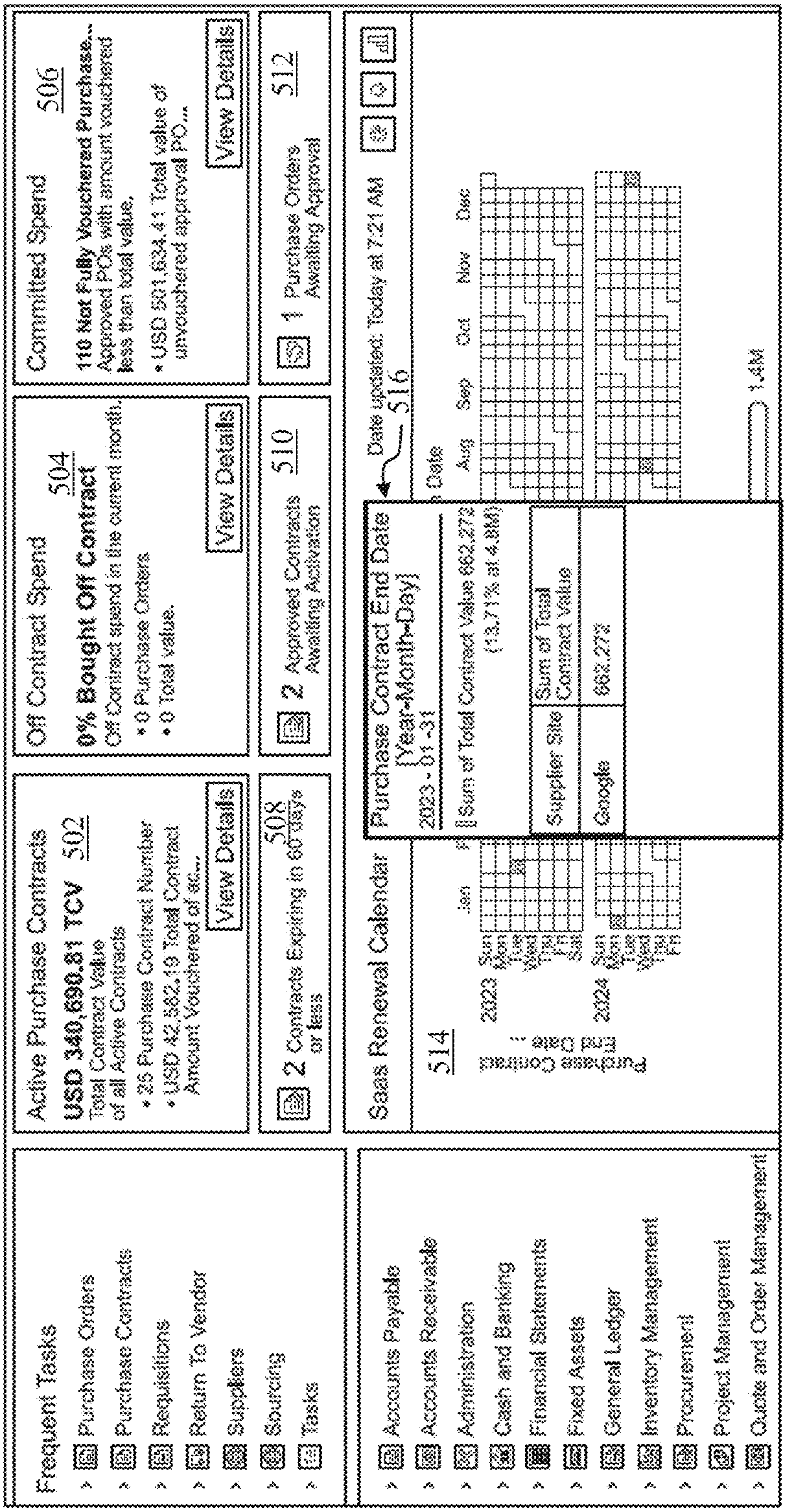

Also, the dashboard provides a calendar visualization 514 that depicts the number of SaaS application contracts that are expiring with their expiration dates. When the user hovers over an icon or square in the calendar visualization 514, a popup 516 is generated in FIG. 5B that provides the user with details regarding the particular contract.

Figure 5C:
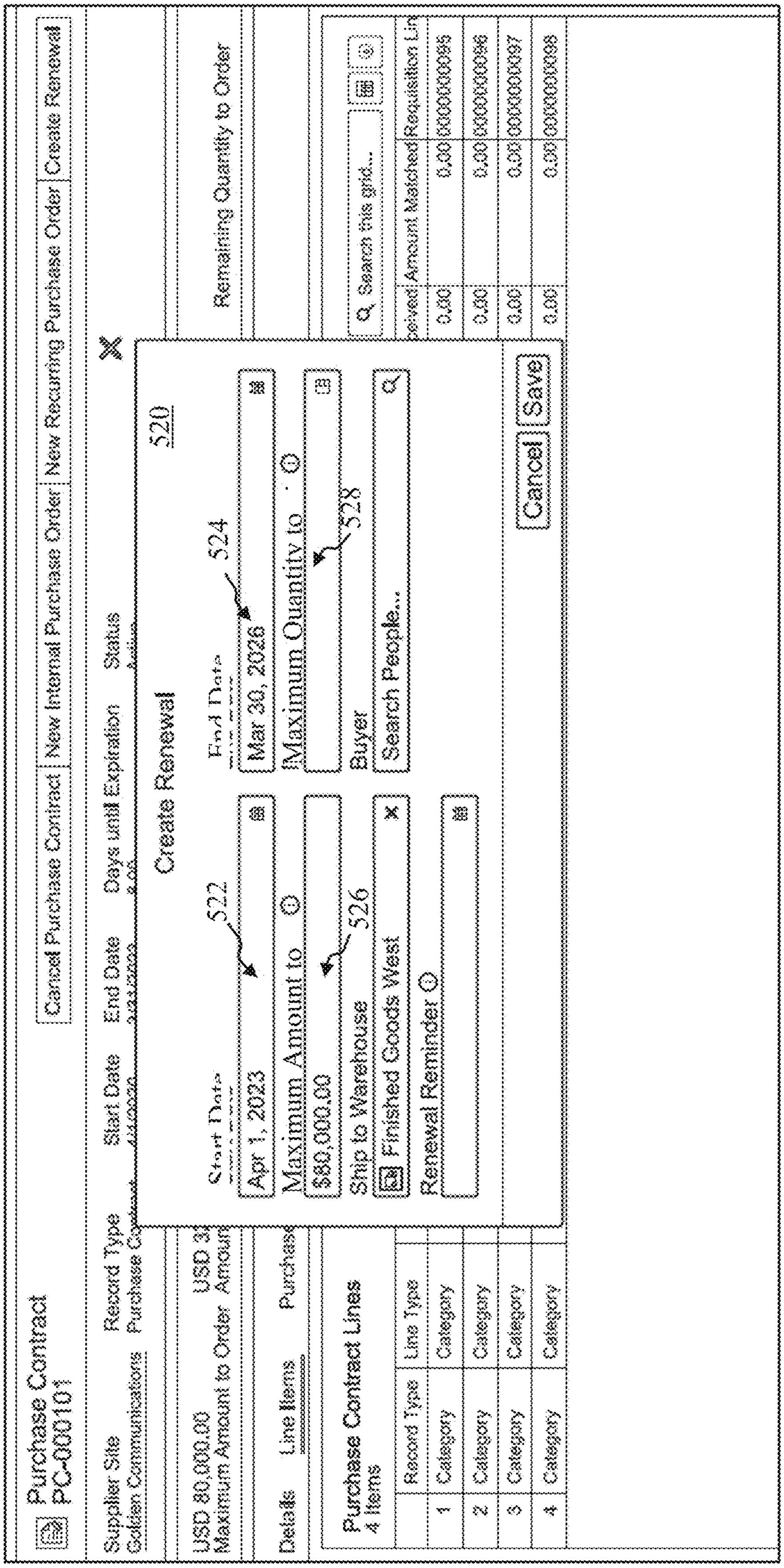

In FIG. 5C, the dashboard can give the user an automatic process to renew a SaaS contract. When a user clicks on an expiring contract, the service provider creates an automatic renewal form 520 that receives input from the user such as start 522 and end 524 dates, contract order maximums 526 and quantities 528, as well as vendor selection.

Figure 6:
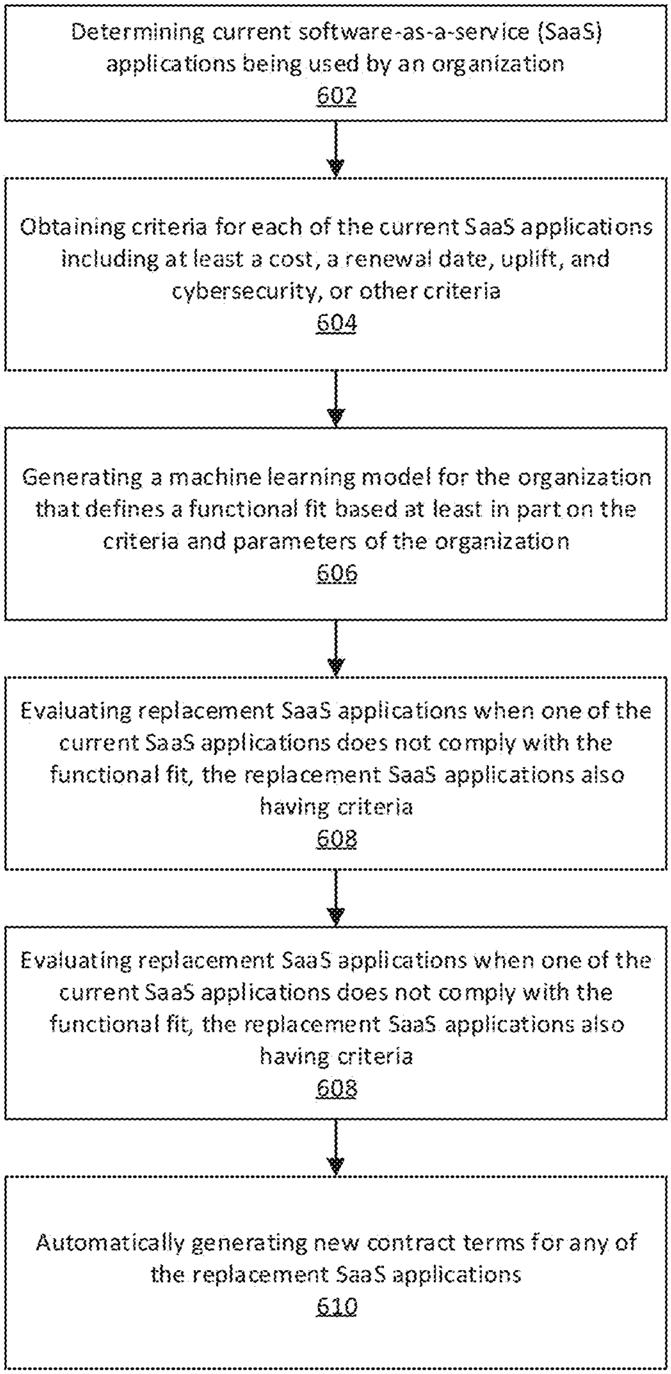
FIG. 6 is a flowchart of an example method of the present disclosure.

FIG. 6 is a flowchart of an example process. The method includes a step 602 of determining current software-as-a-service (SaaS) applications being used by an organization. This can include auditing machines on the network of the organization, scanning the network for API calls, or collecting expenditure data for SaaS spend. Next, the method includes a step 604 obtaining criteria for each of the current SaaS applications including at least a cost, a renewal date, uplift, and cybersecurity (or any other quantitative or qualitative criteria). To be sure, the organization may have parameters or thresholds that define KPIs or other metrics that should ideally be met by any instance of SaaS applications allowed to run within the organization. These could relate to specific tasks for specific departments. For example, for engineering SaaS, an application could be required to have a minimum set of capabilities or features to comply with the requirements of the organization. Each type of SaaS application for each division or unit of the organization can likewise be defined. This essentially defines a minimum set of features that should be present in any given instances of SaaS software. Additionally, ancillary criteria could include price, renewal term, cybersecurity features, communication protocols, or the like.

Using these criteria or expectations for the organization, the methods can include a step 606 of generating a machine learning model for the organization that defines a functional fit based at least in part on the criteria and parameters of the organization. Thus, functional fit defines the needs of the organization and a functional fit model can be generated for each type of SaaS used by the organization or a functional fit model can be generated from a more generalized view of the organization. It will be understood that at least a portion of the criteria of the current SaaS applications are defined by a user of the organization.

Using the model(s), the method can then execute a step 608 of evaluating replacement SaaS applications when one of the current SaaS applications does not comply with the functional fit, the replacement SaaS applications also having criteria. That is, the model or models are used to identify current SaaS applications that have at least one criterion that are not aligned with the parameters of the organization. Once a misalignment is determined, the method can include a step 610 of automatically generating new contract terms for any of the replacement SaaS applications. A user may have the authority to approve or decline the contract terms or the SaaS replacement, but the terms of the contract are automatically generated.

In some embodiments, the method can include generating a dynamic playbook that is used to optimize a selection process for replacing or retaining SaaS applications, as noted above. In some instances, generating the dynamic playbook includes generating weighted metrics for the criteria of the replacement SaaS applications and the criteria of the current SaaS applications.

As noted above, the method may include a step of activating an automated workflow application configured to procure a replacement SaaS application in accordance with an algorithmic workflow. In some embodiments, the automated workflow application comprises identifying end users configured to approved to select a vendor of the replacement SaaS application, as well as receiving data representing approvals to select the vendor of the replacement SaaS application from the end users. In some instances, at least one approval is performed automatically.

The method can also include a step of monitoring performance data for the current SaaS applications to calculate utilization thereof. For example, API connections can be monitored by the service provider to determine how frequently a SaaS application is being used. If the service provider detects that the software is not being used, the service provider can automatically select a replacement SaaS application based on utilization data. For example, it may be determined that users are not using a particular accounting program that the organization has licenses to use. By tracking utilization data, the service provider can suggest canceling the contract or not renewing. In another example, the service provider could suggest a replacement application that might better align with the needs of the users as defined by a machine learning model. For example, the users could be automatically surveyed to determine why the software is not being used. Answers to the survey could be used to create suggestions for replacement software. In another method, performance data can be used to predict forecasted data and select one of the replacement SaaS applications as a function of the forecasted data.

Figure 7:
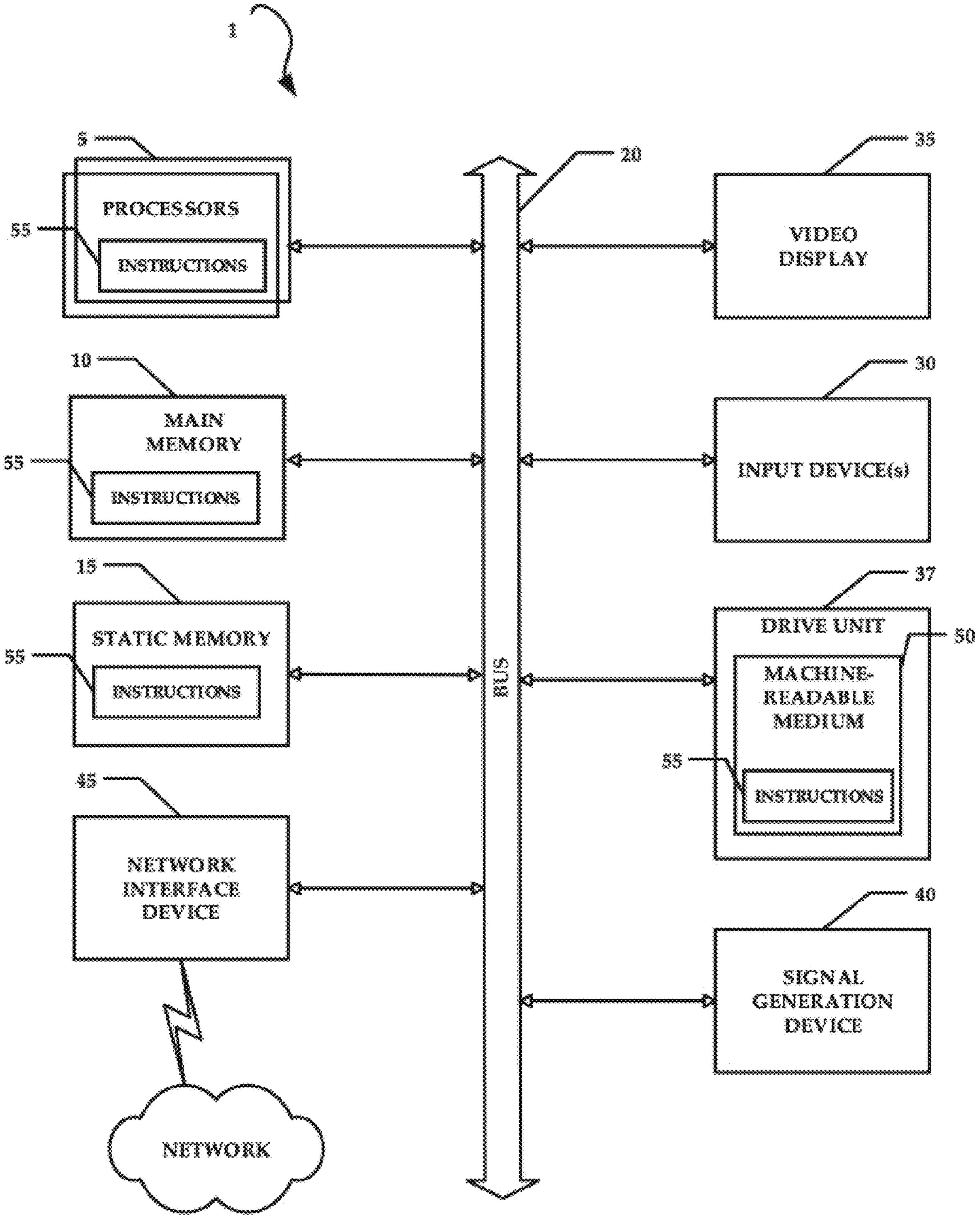
FIG. 7 is a simplified block diagram of a computing system, in accordance with some embodiments.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or decentralized) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or decentralized database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The invention claimed is:

1. A computer implemented method for assessing software-as-a-service (SaaS) applications to address cybersecurity vulnerabilities and determining contract terms for replacement SaaS applications, the method comprising:

determining current cybersecurity SaaS applications being used by an organization on a network, the determining comprising scanning the network for Application Program Interface (API) calls;

generating a machine learning model for the organization that defines a functional fit based at least in part on criteria of the organization;

monitoring, using a processor, the cybersecurity SaaS applications utilizing APIs by tracking data traffic associated with the cybersecurity SaaS applications, to address the cybersecurity vulnerabilities including security holes or attack points;

determining the organization's cybersecurity SaaS applications utilization over an interval of time based on the data traffic associated with the cybersecurity SaaS applications;

obtaining criteria for each of the current cybersecurity SaaS applications, the criteria comprising data security requirements, the data security requirements including data protocols configured to implement encryption;

inputting an updated functional fit into the machine learning model to evaluate cybersecurity replacement SaaS applications, using the processor, the updated functional fit being based on current needs of the organization, the organization's cybersecurity SaaS applications utilization, a SaaS budget, and the criteria;

evaluating, using a processor, cybersecurity replacement SaaS applications by the machine learning model when one of the current cybersecurity SaaS applications does not comply with the updated functional fit according to the cybersecurity SaaS applications current utilization and the cybersecurity replacement SaaS applications also having the criteria; and automatically generating new contract terms by the machine learning model for any of the cybersecurity replacement SaaS applications.

2. The method according to claim 1, further comprising generating a dynamic playbook that is used to optimize a selection process for replacing or retaining the cybersecurity SaaS applications.

3. The method according to claim 2, wherein at least a portion of the criteria of the current cybersecurity SaaS applications are defined by a user of the organization.

4. The method according to claim 3, wherein generating the dynamic playbook includes generating weighted metrics for the criteria of the cybersecurity replacement SaaS applications and the criteria of the current cybersecurity SaaS applications.

5. The method according to claim 1, further comprising activating an automated workflow application configured to procure a cybersecurity replacement SaaS application in accordance with an algorithmic workflow.

6. The method according to claim 5, wherein activating the automated workflow application comprises:

identifying end users configured to approve to select a vendor of the cybersecurity replacement SaaS application; and receiving data representing approvals to select the vendor of the cybersecurity replacement SaaS application from the end users, wherein at least one approval is performed automatically.

7. The method according to claim 1, wherein the criteria include at least one key performance indicator ("KPI") metric.

8. The method according to claim 7, wherein the criteria include data representing terms in an electronic document constituting requirements associated with an exchange of data.

9. The method according to claim 1, further comprising:

monitoring performance data for the current cybersecurity SaaS applications to calculate utilization thereof; and selecting one of the cybersecurity replacement SaaS applications based on utilization data.

10. The method according to claim 1, further comprising:

monitoring performance data;

predicting data based on the performance data during an interval of time to form forecasted data; and selecting one of the cybersecurity replacement SaaS applications as a function of the forecasted data.

11. The method according to claim 1, wherein the contract terms include renewal dates, uplift, and vendor.

12. The method according to claim 1, wherein the data protocols include PCI DSS protocols and ACH protocols.

13. A computer system for assessing and determining terms for replacement cybersecurity software-as-a-service (SaaS) applications to address cybersecurity vulnerabilities and determining contract terms for cybersecurity replacement SaaS applications, the system comprising:

a processor; and memory for storing instructions, the processor executing the instructions to:

determine current cybersecurity SaaS applications being used by an organization on a network, the determining comprising scanning the network for Application Program Interface (API) calls;

generate a machine learning model for the organization that defines a functional fit based at least in part on criteria of the organization;

monitor the cybersecurity SaaS applications utilizing an APIs that tracks data traffic associated with the cybersecurity SaaS applications, to address the cybersecurity vulnerabilities including security holes or attack points;

determine the organization's cybersecurity SaaS applications utilization over an interval of time based on the data traffic associated with the cybersecurity SaaS applications;

obtain criteria for each of the current cybersecurity SaaS applications, the criteria comprising data security requirements, the data security requirements including data protocols configured to implement encryption;

input an updated functional fit into the machine learning model to evaluate cybersecurity replacement SaaS applications, the updated functional fit being based on current needs of the organization, the organization's cybersecurity SaaS applications utilization, a SaaS budget, and the criteria of each of the current cybersecurity SaaS applications;

evaluate cybersecurity replacement SaaS applications by the machine learning model when one of the current cybersecurity SaaS applications does not comply with the updated functional fit according to the cybersecurity SaaS applications current utilization based on API traffic analysis and the cybersecurity replacement SaaS applications also having the criteria;

generate a dynamic playbook that is used to optimize a selection process for replacing or retaining the cybersecurity SaaS applications; and generate a dashboard that indicates recommendations of the current cybersecurity SaaS applications that should be replaced based on the dynamic playbook.

14. The system according to claim 13, wherein at least a portion of the criteria of the current cybersecurity SaaS applications are defined by a user of the organization.

15. The system according to claim 14, wherein the processor is configured to generate the dynamic playbook by generating weighted metrics for the criteria of the cybersecurity replacement SaaS applications and the criteria of the current cybersecurity SaaS applications.

16. The system according to claim 13, wherein the processor is configured to activate an automated workflow application configured to procure a cybersecurity replacement SaaS application in accordance with an algorithmic workflow.

17. The system according to claim 16, wherein the processor is configured to activate the automated workflow application to:

identify end users configured to approve to select a vendor of the cybersecurity replacement SaaS application; and receive data representing approvals to select the vendor of the cybersecurity replacement SaaS application from the end users, wherein at least one approval is performed automatically.

18. The system according to claim 13, wherein the processor is configured to:

monitor performance data for the current cybersecurity SaaS applications to calculate utilization thereof; and select one of the cybersecurity replacement SaaS applications based on utilization data.

19. The system according to claim 18, wherein the processor is configured to:

monitor the performance data;

predict data based on the performance data during an interval of time to form forecasted data; and select one of the cybersecurity replacement SaaS applications as a function of the forecasted data.

20. The system according to claim 13, wherein the processor is configured to automatically generate new contract terms by the machine learning model for any of the cybersecurity replacement SaaS applications.

21. The system according to claim 13, wherein the criteria include data representing terms in an electronic document constituting requirements associated with an exchange of data.

22. The system according to claim 13, wherein the processor is configured to:

evaluate invoices and subsequent payments for a customer;

evaluate payment history for the customer; and generate a suggestion to shorten a time span for payment of an invoice based on the payment history.

* * * * *